US 8,516,508 B1

(12) United States Patent
Tran (10) Patent No.: US 8,516,508 B1
(45) Date of Patent: Aug. 20, 2013

(54) AUTOMATED APPLICATION PROGRAMMING INTERFACE (API) GENERATION

(75) Inventor: Loc Tien Tran, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/564,904

(22) Filed: Aug. 2, 2012

(51) Int. Cl.
*G06F 13/00* (2006.01)

(52) U.S. Cl.
USPC .......................................... 719/328; 717/106

(58) Field of Classification Search
USPC .......................................... 719/328; 717/106
See application file for complete search history.

(56) References Cited

U.S. PATENT DOCUMENTS

| 7,275,251 | B2 | 9/2007 | Gitelson et al. | |
|---|---|---|---|---|
| 7,458,073 | B1 | 11/2008 | Darling et al. | |
| 7,818,780 | B1 | 10/2010 | Salmi et al. | |
| 8,117,589 | B2* | 2/2012 | Christensen et al. | 717/106 |
| 8,255,888 | B2* | 8/2012 | Jesse et al. | 717/143 |
| 2002/0184409 | A1* | 12/2002 | Broussard | 709/328 |
| 2003/0120822 | A1* | 6/2003 | Langrind et al. | 709/251 |
| 2011/0321032 | A1 | 12/2011 | Ciccone | |

\* cited by examiner

*Primary Examiner* — Andy Ho
(74) *Attorney, Agent, or Firm* — Edell, Shapiro & Finnan LLC (57) ABSTRACT

Techniques are provided for automatically generating Application Programming Interfaces (APIs) in a computing device. In one example, a request for the addition of a first API to a software infrastructure of a computing device is received. An API coding table that includes one or more initial API parameters corresponding to the first API is generated and an API coding template stored in memory of the computing device is obtained. A compiler of the computing device generates functional codes for the first API based on the API coding template and the initial API parameters.

21 Claims, 4 Drawing Sheets

AUTOMATED APPLICATION PROGRAMMING INTERFACE (API) GENERATION

TECHNICAL FIELD

The present disclosure relates generally to Application Program Interfaces (APIs).

BACKGROUND

A software component (application, program, etc.) of a computing device/system will generally request other hardware/software components to perform operations/tasks on its behalf. To accomplish this, the requesting software component uses a set of standardized requests, collectively called an Application Programming Interface (API).

In general, an API is a mechanism that allows software components to communicate with one another. APIs may include specifications for routines, data structures, object classes, variables, etc., and may be defined in accordance with an international standard such as Portable Operating System Interface (POSIX) or may be specifically defined by a vendor. The term API may refer to a complete interface, a single function, a group of functions, etc.

Due to the widespread use of APIs, software development kits (SDKs) have been proposed and widely used. SDKs are, in essence, a set of software development tools that enables a programmer to create software for a specific platform (e.g., a software package, software framework, hardware platform, computer system, video game console, operating system, or similar platform). Typically, an SDK includes predefined APIs, programming tools, and supporting documentation.

DESCRIPTION OF EXAMPLE EMBODIMENTS

Overview

Techniques are provided for automatically generating Application Programming Interfaces (APIs) in a computing device. In one example, a request for the addition of a first API to a software infrastructure of a computing device is received. An API coding table that includes one or more initial API parameters corresponding to the first API is generated and an API coding template stored in memory of the computing device is obtained. A compiler of the computing device generates functional codes for the first API based on the API coding template and the initial API parameters.

Example Embodiments

One of the traditional goals for developing a software development kit (SDK) is to provide a consistent Application Programming Interface (API) for communication (i.e., to enable other computing components to communicate with the software component). SDKs may be implemented on platforms that have hardware and software capabilities and, as such, the number of APIs defined for an SDK could increase after initial deployment. In certain examples, the number of APIs may be in the hundreds or even thousands as new features are introduced to a platform. This is problematic in traditional arrangements where a user (e.g., engineer or programmer) uses the SDK to generate new APIs that support the added functionality. Therefore, proposed herein is a scalable API infrastructure that is configured to support a large number of APIs and to facilitate automatic generation of new APIs with little or no user input, thereby providing a highly scalable software platform.

For ease of illustration, examples will be described herein with reference to use of the scalable API infrastructure in a system that includes an SDK. In these examples, applications communicate with one or more application specific integrated circuits (ASICs). It is to be appreciated that these examples are non-limiting and that the scalable API infrastructure described herein may be implemented in a number of different computing systems to support API-based software-to-software communication and may be used with an SDK.

Figure 1:
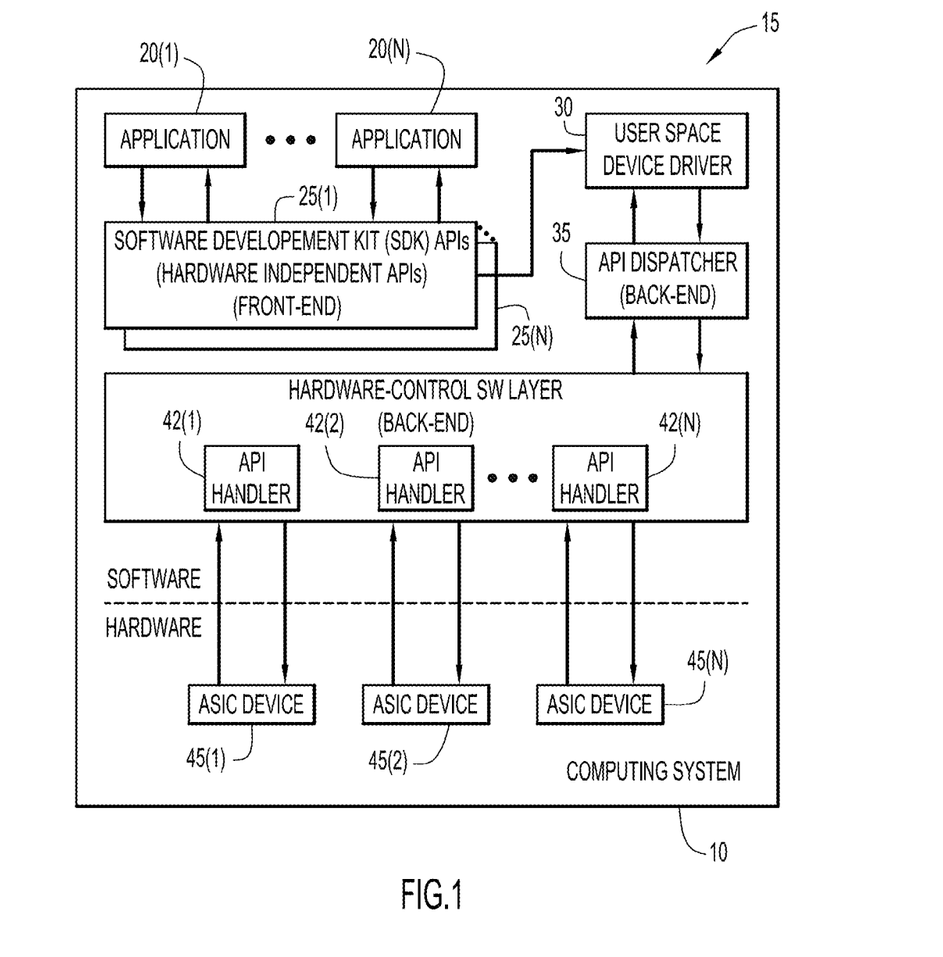
FIG. 1 is a schematic diagram of a computing system configured to automatically generate APIs.

FIG. 1 is a schematic diagram of one example computing system 10 that includes a scalable API infrastructure 15. Computing system 10 also includes a plurality of applications 20(1)-20(n), hardware independent APIs 25(1)-25(n), a user space device driver 30, an API dispatcher 35, a hardware-control software layer 40 that includes API handlers 42(1)-42(n), and ASIC devices (ASICs) 45(1)-45(N).

Applications 20(1)-20(n) may comprise, for example, protocol applications (e.g., Open Shortest Path First (OSPF), IS-IS, etc.) or other applications such as access control list (ACL) applications or quality of service (QoS) applications. The hardware independent APIs 25(1)-25(n) are, in this example, SDK APIs that are used by applications 20(1)-20(n) to request programming of the hardware ASICs 45(1)-45(n). More specifically, in this example an API 25(1) takes input parameters from application 20(1) and uses Inter-Process Communication (IPC) to pass these parameters to the user space device driver 30. These APIs 25(1)-25(n) are sometimes referred to herein as "front-end" APIs or the "front-end" of the communication process.

The user space device driver 30 receives the programming request parameters generated by application 20(1) from API 25(1) (via the IPC) and is configured to use the parameters for programming the hardware ASICs 45(1)-45(n). That is, the user space device driver 30 is configured to invoke the API dispatcher 35 to dispatch (call) the programming request parameters to the corresponding API handler for the specific executed API 25(1).

The API handlers 42(1)-42(n) reside in the hardware-control software layer 40. There is one API handler 42(1)-42(n) for each API 25(1)-25(n) (i.e., a one-one-correspondence between APIs and API handlers). The API handler 42(1) (corresponding to API 25(1)) receives the programming request parameters and uses these parameters to program one or more of the hardware ASIC devices 45(1)-45(N) in accordance with the original request from the application 20(1). The API dispatcher 35 and hardware-control software layer 40 are part of the "back-end" of the software-to-software communication process. In certain examples, the API handlers may be specific to an ASIC such that there could be multiple API handlers (i.e., one per ASIC) for the same front-end API. Because the ASICs may be designed to implement particular functions, the API handlers for each ASIC could also be different. In the SDK architecture, there are separate handlers among the ASICs.

The hardware-control software layer is a platform dependent layer that may, in this example, be a hardware abstraction layer (HAL). A HAL is implemented in software between the physical hardware ASICs 45(1)-45(n) of computer system 10 and the other software components. In general, the function of a HAL is to hide differences in hardware from the operating system kernel, so that most of the kernel-mode code does not need to be changed to run on systems with different hardware.

The foregoing describes the general operations of an API executed on the scalable API infrastructure 15. However, before APIs may be used, they are first generated for subsequent use. In this example, the scalable API infrastructure 15 uses a complier to automatically generate API program codes based on a stored coding template and predefined API parameters. In other words, one macro is initially defined and the compiler expands this macro to produce a functional API. Consistent naming conventions are used through the infrastructure to facilitate various operations, and a Type Length Value (TLV) is used to package API payloads to send parameters from API (front-end) to back-end API handlers. As a result, the scalable API infrastructure optimizes API dispatch time, provides precise API dispatching to appropriate API back-end handlers, and provides the ability to batch APIs (i.e., lump multiple APIs in one generic API call).

Figure 2:
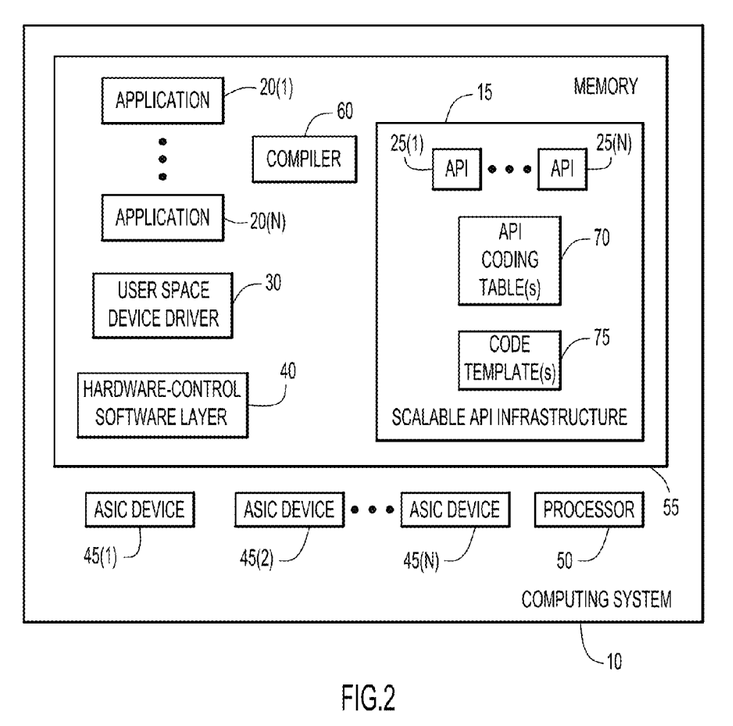
FIG. 2 is a block diagram of a computing system having a scalable API infrastructure that facilitates automatic generation of APIs.
Figure 3:
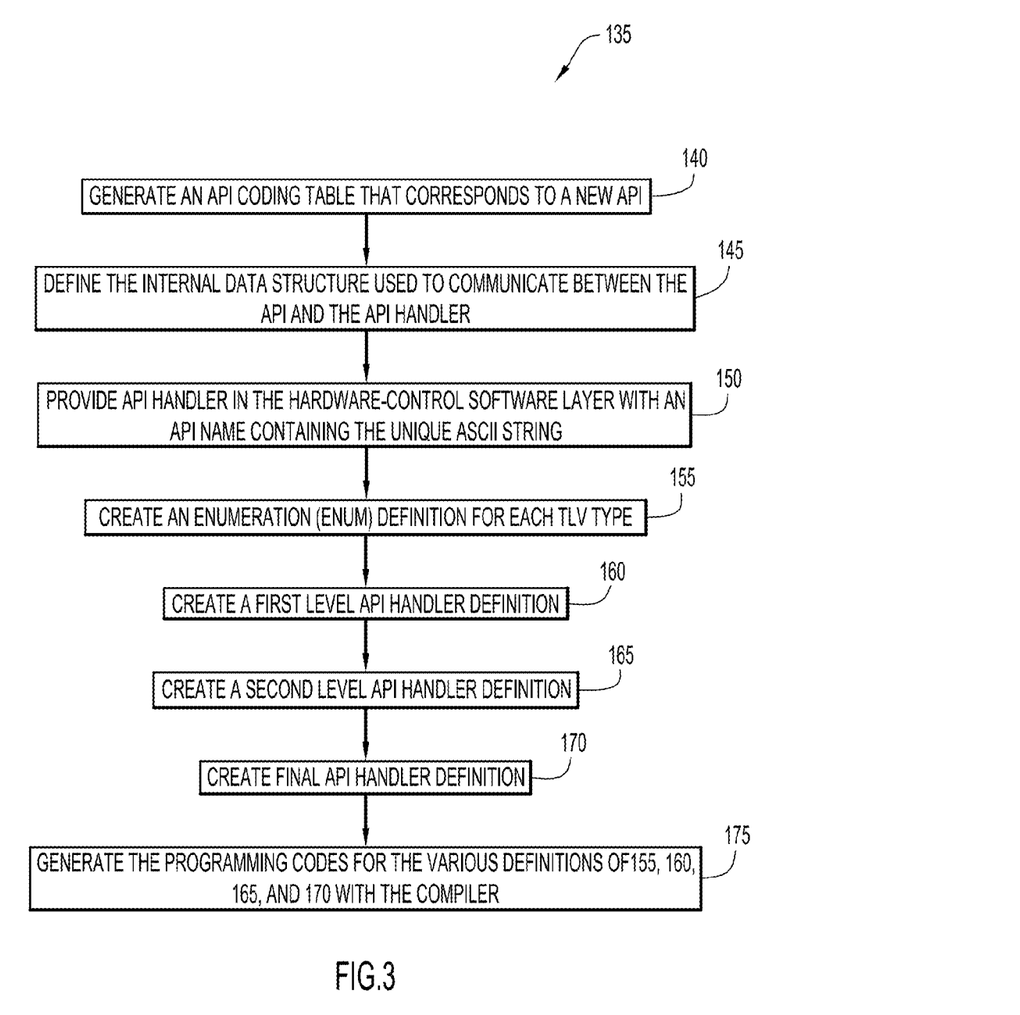
FIG. 3 is a detailed flowchart illustrating a method that includes automatically generating an API.

FIG. 2 is a block diagram of computing system 10 that illustrates various data structures and software elements of scalable API infrastructure 15 used to generate and dispatch APIs. FIG. 3 is a flowchart illustrating a detailed method 135 of the functions of scalable API infrastructure 15 to generation and dispatch of an API. The schematic diagram of FIG. 2 will be described with reference to the method of FIG. 3.

Computing system 10 may be a server, computer (e.g., desktop, laptop, etc.), networking device (router, switch, firewall, etc.), or any other system in which software components communicate with other hardware or software components. Computing system 10 comprises ASIC devices 45(1)-45(N), processor 50, and memory 55. Memory 55 comprises applications 20(1)-20(N), user space device driver 30, hardware-control software layer 40, a compiler 60, and scalable API infrastructure 15. Scalable API infrastructure 15 includes one or more API coding tables 70 and one or more coding templates 75.

Memory 55 may comprise read only memory (ROM), random access memory (RAM), magnetic disk storage media devices, optical storage media devices, flash memory devices, electrical, optical, or other physical/tangible memory storage devices. The processor 50 is, for example, a microprocessor or microcontroller that executes instructions for the applications 20(1)-20(n), user space device driver 30, hardware control software layer 4, compiler 60, and scalable API infrastructure 15. Thus, in general, the memory 55 may comprise one or more tangible (non-transitory) computer readable storage media (e.g., a memory device) encoded with software comprising computer executable instructions and when the software is executed (by the processor 50) it is operable to perform the operations described herein in connection with applications 20(1)-20(n), user space device driver 30, hardware control software layer 40, compiler 60, and scalable API infrastructure 15.

The mechanism employed in the examples described herein is to utilize the compiler 60 to automatically generate (auto-generate) sections of functional API code when a new API is added. In order to have the compiler 60 auto-generate the sections of programming code, the scalable API infrastructure includes one or more pre-stored "code templates" 75 that are used by the compiler 60. That is, the compiler 60 takes a code template 75 and compiles it with some user input API parameters in a manner that expands the template into a functional API. As such, the coding infrastructure provided herein allows for a growth in the number of supported APIs while minimizing coding errors. As used herein, automatically generating the functional code means that, after the initial API parameters are established, little or no further user coding occurs to generate the API codes.

In operation, the API parameters used in the scalable API infrastructure 15 include a Type-Length-Value (TLV). The "Type" is unique to the API, the "Value" is the internal data structure used to carry API parameters from the API to the API's handler, and the "Length" is the bytes length of the "Value."

As shown at 140 of FIG. 3, when a new API is to be created, an API coding table 70 is generated that corresponds to the new API. The API coding table 70 is generated to include a TLV for the new API as well as a unique keyword associated with the new API. The unique keyword may be an American Standard Code for Information Interchange (ASCII) string. As described below, these initial API parameters input into the API coding table 70 (i.e., TLV and unique keyword) form a macro that is subsequently expanded for different purposes by the complier 60.

In the example of FIG. 2, the new API relates to a virtual local area network (VLAN) and, as such, the coding table 70 is sometimes referred to below by the name "TABLE_LIBSDK_VLAN." The coding table 70 may be generated based on information input by a user (i.e., a user defines the TLV and ASCII string) and/or may be partially or fully automatically generated based on information from another software component or other computing system.

Next, at 145 of FIG. 3, the internal data structure (Value) used to communicate between the API and the API handler is defined. This internal data structure will include the unique ASCII string defined in the API coding table 70 (i.e., the ASCII string associated with the new API). In this example, the unique ASIC string is "vlan_create" and the internal data structure is "struct_libsdk_vlan_create_t" for a VLAN API. These data structure form a payload to carry user input API parameters from the front-end to the back-end. These data structures include all the parameters provided by the caller and some additional fields. These structures are also defined when the APIs are defined and the caller is not aware of this data structure.

At 150, an API handler in the hardware-control software layer 40 is provided with an API name containing the unique ASCII string ("vlan_create") in the format: "int abc_vlan_create(struct_libsdk_vlan_create_t *v_p)."

At 155, the API coding table 70 (TABLE_LIBSDK_VLAN) is used to define an enumeration (enum) for each TLV "Type." In this example, the enumeration definition has the format: "libsdk_enum_t." The resulting enumeration code (later generated by the compiler 60) is used for indexing into an array that provides API handler functions.

At 160, the API coding table 70 (TABLE_LIBSDK_VLAN) is used to create a first level API handler definition. In other words, a front-end API definition that (after compiling) takes the data, packages it, and passes it through the API to the back-end is created. In this example, the first level API handler definition has the format: "int libasic_tlv_hdlr_vlan_create (void *p)." It is to be noted that the "definition" will be generated by the compiler using the code template.

At 165, the API coding table 70 (TABLE_LIBSDK_VLAN) is used to create a second level API handler definition. That is, a back-end API handler definition is created that (after compiling) is used to dispatch the final API handler for each device to the hardware-control software layer 40, depending on the device(s) available on the hardware. As shown below, the unique ASCII string "vlan_create" is also used in this second level API handler definition, which has the format:

static_inline_int
    asic_inline_vlan_create(struct_libsdk_vlan_create_t *v_p)

At 170, the final API handler definition for dispatch to the hardware control layer 40 is created. In the example of FIG. 2, the ASICs are identified as "abc" (for ASIC 45(1)), and xyz (for ASIC 45(2)), and the final API handler definitions are:

int abc_vlan_create(struct_libsdk_vlan_create_t *v_p);
int xyz_vlan_create(struct_libsdk_vlan_create_t *v_p);

At 175, the compiler 60 auto-generates the functional API codes for the various definitions defined in 155, 160, 165, and 170.

As shown above, the TLV Type, internal data structure, API handlers, etc. are defined so as to follow a consistent naming convention and to utilize the unique ASCII string therein to assist in auto-generating functional codes by the compiler 60. To further illustrate this and other aspects, the example use of a new API to create a VLAN is described in further detail in conjunction with the generation of an API to destroy a VLAN. In this specific example, the keyword or ASCII string for the VLAN create API is "vlan_create," while the keyword for the VLAN destroy API is "vlan_destroy."

The TLV Type and ASCII string for the VLAN create and destroy APIs are defined in one or more coding tables 70 ("TABLE_LIBSDK_VLAN"). A macro (LIBSDK_TBL_ENTRY) to define the APIs (with a TLV Type and a unique ASCII) may have the format as shown below:

```
#define TABLE_LIBSDK_VLAN                              \
    LIBSDK_TLV_ENTRY                                   \
    (TLV_TYPE_LIBSDK_VLAN_CREATE, vlan_create)
    LIBSDK_TLV_ENTRY
    (TLV_TYPE_LIBSDK_VLAN_DESTROY, vlan_destroy)
```

The internal data structure is defined with a substring of "vlan_create" and may have the format:
    typedef struct struct_libsdk_vlan_create_s

```
{
    int       dev_inst;   /* IN : asic dev number, zero based  */
    sdk_vlan_t  vlan;     /* IN : VLAN to create               */
    uint16    pad;        /*    : make structure 32-bit align  */
    int       api_rv;     /* OUT: API return codes             */
} PACKED struct_libsdk_vlan_create_t;
```

The ASCII be used in the API handler for an ASIC device, such as ASIC device 45(1), is show below as:
    int abc_vlan_create(struct_libsdk_vlan_create_t *v_p);
    int abc_vlan_destroy(struct_libsdk_vlan_destroy_t *v_p);

As noted, an initial macro is defined to include the TLV Type and ASCII string (keyword). In the scalable API infrastructure, this macro may be redefined one or more times to behave in different manners, thereby facilitating the API generation and subsequent use. More specifically, the definition of TABLE_LIBSDK_VLAN is used and the behavior of the LIBSDK_TBL_ENTRY macro is changed. For example, the definition of the LIBSDK_TLV_ENTRY( ) macro may be redefined, as shown below, to create a list of enumerations:

typedef enum libsdk_enum_e
    {
    #undef LIBSDK_TLV_ENTRY
    #define LIBSDK_TLV_ENTRY(tlv,handler) tlv,
    TABLE_LIBSDK_VLAN
    LIBSDK_ENUM_MAX
    } libsdk_enum_t;

When the compiler 60 compiles these definitions, it generates an enumeration array shown below:
    typedef enum libsdk_enum_e
    {
    TLV_TYPE_LIBSDK_VLAN_CREATE,
    TLV_TYPE_LIBSDK_VLAN_DESTROY,
    LIBSDK_ENUM_MAX,
    } libsdk_enum_t;

Another example of redefining macros is shown below where API handlers can be generated by using the same TABLE_LIBSDK_VLAN definition:

```
#undef LIBSDK_TLV_ENTRY
#define LIBSDK_TLV_ENTRY(tlv, handler)                 \
int libasic_tlv_hdlr_ ##handler (void *p)              \
{                                                      \
    struct_libsdk_ ##handler## _t *v_p =               \
    (struct_libsdk_ ##handler## _t *)p;\
    v_p->api_rv = asic_inline_ ##handler(v_p);         \
    return (v_p->api_rv);                              \
}
TABLE_LIBSDK_VLAN
```

When the compiler 60 compiles these functions, it generates two API handler functions:
    int libasic_tlv_hdlr_vlan_create (void *p)
    {
    struct_libsdk_vlan_create_t *v_p=(struct_libsdk_vlan_create_t *)p;
    v_p->api_rv=asic_inline_vlan_create(v_p);
    return (v_p->api_rv);
    }
    int libasic_tlv_hdlr_vlan_destroy (void *p)
    {
    struct_libsdk_vlan_destroy_t *v_p=(struct_libsdk_vlan_destroy_t *)p;
    v_p->api_rv=asic_inline_vlan_destroy(v_p);
    return (v_p->api_rv);
    }

Finally, the API may be dispatched to a specific handler for the ASIC devices 45(1), 45(2), or 45(3), depending on the hardware platform on which the code is executed (i.e., the same set of APIs could have different implementations for each device on which it is running). The dispatch is shown as:

```
#undef LIBSDK_TLV_ENTRY
#define LIBSDK_TLV_ENTRY(tlv, handler)                       \
static_inline_int                                            \
asic_inline_ #handler(struct_libsdk_ #handler##_t *v_p)      \
{                                                            \
    if (platform == abc)                                     \
        return (abc_ ##handler(v_p));                        \
    else if (platform == xyz)                                \
        return (xyz_ ##handler(v_p));                        \
}
TABLE_LIBSDK_VLAN
```

When the compiler 60 compiles these definitions, it generates the following:

```
    static_inline_int
    asic_inline_vlan_create(struct_libsdk_vlan_create_t
*v_p)
    {
    if (platform==abc)
        return (abc_vlan_create(v_p));
    else if (platform==xyz)
        return (xyz_vlan_create(v_p));
    }
    static_inline_int
    asic_inline_vlan_destroy(struct_libsdk_vlan_destroy_t
*v_p)
    {
    if (platform==abc)
        return (abc_vlan_destroy(v_p));
    else if (platform==xyz)
        return (xyz_vlan_destroy(v_p));
    }
```

With the infra structure above in place, now the actual correspondence handlers are realized through the following definitions (for ASICS 45(1) and 45(3)):

```
    int abc_vlan_create(struct_libsdk_vlan_create_t *v_p);
    int abc_vlan_destroy(struct_libsdk_vlan_destroy_t *v_p);
    int xyz_vlan_create(struct_libsdk_vlan_create_t *v_p);
    int xyz_vlan_destroy(struct_libsdk_vlan_destroy_t *v_p);
```

An objective of the examples described herein is to provide a one time coding that allows for substantially automated addition of further APIs by simply defining the TLV Type and the unique ASCII string for each new API, such as, vlan_port_add or vlan_port_delete as shown below:

In essence, the examples rely upon an infrastructure that allows the compiler 60 to automatically generate functional API codes with minimal user input.

Once a new API is written, an array may be defined to dispatch the API to the handler of that API. The dispatcher function also use the libsdk_enum_t defined earlier as index into this array. The array is generated from a different stored coding template 75 as shown below:

libasic_tlv_handler_t libasic_tlv_handlers [ ]=

```
{
#undef LIBSDK_TLV_ENTRY
#define LIBSDK_TLV_ENTRY(tlv,handler)           \
    {                                           \
        .tlv_apiname    = #handler,             \
        .tlv_type       = tlv,                  \
        .tlv_handler    = libasic_tlv_hdlr_ ##handler,  \
    },
    TABLE_LIBSDK_VLAN
};
```

When the compiler 60 compiles these definitions, it generates the following automatically:

libasic_tlv_handler_t libasic_tlv_handlers[ ]=

```
{
    {
        .tlv_apiname    = vlan_create,
        .tlv_type       = TLV_TYPE_LIBSDK_VLAN_CREATE,
        .tlv_handler    = libasic_tlv_hdlr_vlan_create,
```

---

```
#define TABLE_LIBSDK_VLAN                                                       \
LIBSDK_TLV_ENTRY(TLV_TYPE_LIBSDK_VLAN_CREATE, vlan_create)                       \
LIBSDK_TLV_ENTRY(TLV_TYPE_LIBSDK_VLAN_DESTROY, vlan_destroy)                     \
LIBSDK_TLV_ENTRY(TLV_TYPE_LIBSDK_VLAN_PORT_ADD,vlan_port_add)                    \
LIBSDK_TLV_ENTRY(TLV_TYPE_LIBSDK_VLAN_PORT_DELETE,vlan_port_delete)
typedef struct struct_libsdk_vlan_create_s
{
    int         dev_inst;   /* IN : asic dev number, zero based     */
    sdk_vlan_t  vlan;       /* IN : VLAN to create                  */
    uint16      pad;        /*    : make structure 32-bit align     */
    int         api_rv;     /* OUT: API return codes                */
} PACKED struct_libsdk_vlan_create_t;
typedef struct struct_libsdk_vlan_destroy_s
{
    int         dev_inst;   /* IN : asic dev number, zero based     */
    sdk_vlan_t  vlan;       /* IN : VLAN to destroy                 */
    uint16      pad;        /*    : make structure 32-bit align     */
    int         api_rv;     /* OUT: API return codes                */
} PACKED struct_libsdk_vlan_destroy_t;
typedef struct struct_libsdk_vlan_port_add_s
{
    int         dev_inst;   /* IN : 0-base asic instance number     */
    sdk_vlan_t  vlan;       /* IN : VLAN ID                         */
    uint16      pad;        /*    : make structure 32-bit align     */
    sdk_port_t  front_port; /* IN : 1-base front port number        */
    uint8       pad8[3];    /*    : make structure 32-bit align     */
    int         api_flags;  /* IN : used by SDK backend only        */
    int         api_rv;     /* OUT: API return codes                */
} PACKED struct_libsdk_vlan_port_add_t;
typedef struct struct_libsdk_vlan_port_delete_s
{
    int         dev_inst;   /* IN : 0-base asic instance number     */
    sdk_vlan_t  vlan;       /* IN : VLAN ID                         */
    uint16      pad;        /*    : make structure 32-bit align     */
    sdk_port_t  front_port; /* IN : 1-base front port number        */
    uint8       pad8[3];    /*    : make structure 32-bit align     */
    int         api_rv;     /* OUT: API return codes                */
} PACKED struct_libsdk_vlan_port_delete_t;
```

-continued

```
    },
    {
        .tlv_apiname   = vlan_destroy,
        .tlv_type      = TLV_TYPE_LIBSDK_VLAN_DESTROY,
        .tlv_handler   = libasic_tlv_hdlr_vlan_destroy,
    },
};
```

From the enum libsdk_enum_t, it can be seen that TLV_TYPE_LIBSDK_VLAN_CREATE has a value of zero (0), and that TLV_TYPE_LIBSDK_VLAN_DESTROY has a value of one (1). These values can be used to index into libasic_tlv_handlers[ ] array to get the handler function for that API. Therefore, dispatching to the corresponding API handler is error free and fast.

In certain examples, once the first API coding template is created, then the subsequent templates are a modified copy of the first template that has the table at the end. This is shown in the following examples for VLAN and the L2 module:

```
/* VLAN template */
#undef LIBSDK_TLV_ENTRY
#define LIBSDK_TLV_ENTRY(tlv, handler)                          \
int libasic_tlv_hdlr_ ##handler (void *p)                       \
{                                                                \
    struct_libsdk_ ##handler## _t *v_p =                        \
    (struct_libsdk_ ##handler## _t *)p; \
    LIBASIC_BE_TRACE("called");                                  \
    v_p->api_rv = asic_inline_ ##handler(v_p, tlv);              \
    LIBASIC_BE_TRACE("exit");                                    \
    return (v_p->api_rv);                                        \
}
TABLE_LIBSDK_VLAN
/* L2 template */
#undef LIBSDK_TLV_ENTRY
#define LIBSDK_TLV_ENTRY(tlv, handler)                          \
int libasic_tlv_hdlr_ ##handler (void *p)                       \
{                                                                \
    struct_libsdk_ ##handler## _t *v_p =                        \
    (struct_libsdk_ ##handler## _t *)p; \
    LIBASIC_BE_TRACE("called");                                  \
    v_p->api_rv = asic_inline_ ##handler(v_p, tlv);              \
    LIBASIC_BE_TRACE("exit");                                    \
    return (v_p->api_rv);                                        \
}
TABLE_LIBSDK_L2
```

As shown, the difference between these two templates is the tables (TABLE_LIBSDK_VLAN and TABLE_LIBSDK_L2).

An API used by an application to perform an operation may be referred to as a front-end API, and the handler for that API may be referred to as a back-end handler. For each front-end API, there is a corresponding TLV Value associated with it. Therefore, in the API function, that TLV is used as part of the payload passed to the back-end dispatcher. The back-end dispatcher extracts the TLV Value and uses it to index into the libasic_tlv_handlers[ ] to get the entry with the handler function in that API.

Described above is the infrastructure to help facilitate dispatching of an API to the correct API handler in the back-end. An example of a front-end API function to create a VLAN in the hardware (i.e., the API generated through the above infrastructure and which is called from the applications) is shown below:

```
/* this is the front-end API to create a vlan in the hardware */
int
libsdk_vlan_create (int dev_inst, sdk_vlan_t vlan)
{
    struct_libsdk_vlan_create_t vlan_create;
    libsdk_tlv_t            *libsdk_tlv_p;
    uint32                  libsdk_tlv_sz;
    char                    data[sizeof(libsdk_tlv_t) + sizeof(tlv_t) +
                                  sizeof(struct_libsdk_vlan_create_t)];
    int         rc;
    libsdk_tlv_sz = sizeof(libsdk_tlv_t) + sizeof(tlv_t) +
            sizeof(struct_libsdk_vlan_create_t);
    libsdk_tiv_p = (libsdk_tlv_t *)data;
    /* parameter checking */
    /* packaging */
    vlan_create.dev_inst   = dev_inst;
    vlan_create.vlan       = vlan;
    vlan_create.api_rv     = LIBSDK_ERR_NONE;
    /* send to back-end */
    if ((rc = libsdk_tlv_fe_handler(libsdk_tlv_p, libsdk_tlv_sz ,
                        TLV_TYPE_LIBSDK_VLAN_CREATE,
                        sizeof(struct_libsdk_vlan_create_t),
                        (char *)&vlan_create   )) !=LIBSDK_ERR_NONE)
    {
        return (rc);
    }
    return (vlan_create.api_rv);
}
```

Figure 4:
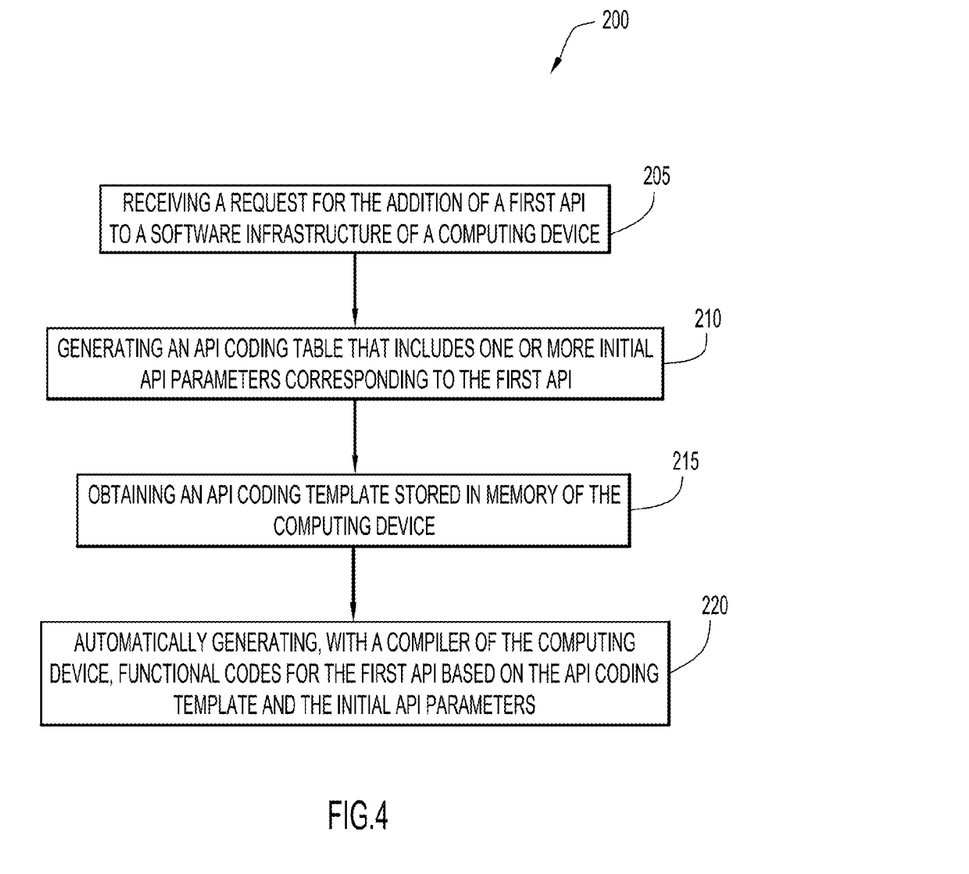
FIG. 4 is a high-level flowchart of an example method executed in accordance with examples described herein.

FIG. 4 is a flowchart of a high-level method 200 executed in accordance with examples described herein. At 205, a request for the addition of a first API to a software infrastructure of a computing device is received. At 210, an API coding table that includes one or more initial API parameters corresponding to the first API is generated. At 215, an API coding template stored in memory of the computing device is obtained. At 220, a compiler of the computing device automatically generates functional codes for the first API based on the API coding template and the initial API parameters. The one or more of the generated functional codes may then be dispatched to a back-end (hardware-control software layer) of the software infrastructure.

In certain examples, two or more initial API parameters are used for generating the API coding table. These initial API parameters may comprise a unique ASCII string corresponding to the first API, and a TLV corresponding to the first API. Additionally, the initial API parameters may be entered by a user (i.e., the API coding table may be generated based on one or more user inputs identifying the one or more initial API parameters).

In certain examples, automatically generating the functional codes for the first API based on the API coding template and the initial API parameters comprises defining an internal data structure useable to communicate between the first API and an API handler in a back-end of the software infrastructure. Each API may have its own internal data structure and the name of the structure has the unique ASCII string embedded in it. This data structure contains front-end API parameters passed in by the caller. Some additional fields to be used by the SDK infra-structure and some fields could be defined to assist batching or other functions.

Automatically generating the functional codes for the first API may further include generating an enumeration definition for the TLV Type. This enumeration coding template is generated only once and more tables may be added, such as shown below.

```
typedef enum libsdk_enum_e
{
    #undef LIBSDK_TLV_ENTRY
    #define LIBSDK_TLV_ENTRY(tlv,handler)    tlv,
    TABLE_LIBSDK_ALL
    LIBSDK_ENUM_MAX
} libsdk_enum_t;
Where TABLE_LIBSDK_ALL can look like below
#define TABLE_LIBSDK_ALL                    \
    TABLE_LIBSDK_VLAN                       \
    TABLE_LIBSDK_L2                         \
    TABLE_LIBSDK_L3
    Etc...
```

Automatically generating the functional codes for the first API may further include receiving a front-end API handler definition, creating a back-end API handler definition, receiving a final API handler definition, and compiling the enumeration definition, the front-end API handler definition, the back-end API handler definition, and the final API handler definition with the compiler to generate functional codes for the first API. The front-end API handler definition may be manually coded. Similarly, the final API handler definition may also be manually coded based on the ASIC design. The back-end API handler definition is uses the template and is automatically created for all back-end handlers.

In summary of the above, an infrastructure is described that enables a method to substantially auto-generate programming codes from a coding template using a compiler. This helps eliminate coding errors and minimize coding from SDK software developers. That is, the infrastructure enables the compiler to expand the code template to obtain a desired function API. Throughout the infrastructure, the coding templates are used in conjunction with a unique ASCII string (e.g., "vlan_create", "vlan_destroy") that enables the auto-generation without user involvement. Additionally, to dispatch a generated API in the back-end, another coding template is used to generate an array of API handlers. Software operates on this array to invoke the handler by using TLV as index into this array.

Additionally, the use of the TLV data structure allows the batching of multiple TLVs into a single request payload send from applications to a user space device driver. This means that, through the described infrastructure, applications can bundle one or more APIs in one request and send the request to the user space device driver. The single message containing the batched APIs is decoded at the back-end. This batching mechanism keeps the amount of communication messages between the applications and the user space device driver at the minimum and thus reduces the overall CPU usage.

Described herein are techniques to efficiently dispatch large number of APIs to their handlers by providing an infrastructure to utilize the compiler to auto-generate codes in order to scale to unlimited number (hundred or thousand or more) of APIs as required in a HAL or SDK software development. It is to be appreciated that the described techniques are not limited to HAL or SDK development only, but rather may be used in any software-to-software implementation.

The above description is intended by way of example only.

What is claimed is:

1. A method comprising:
   receiving a request for the addition of a first Application Programming Interface (API) to a software infrastructure of a computing device;
   generating an API coding table that includes one or more initial API parameters corresponding to the first API;
   obtaining an API coding template stored in memory of the computing device; and
   automatically generating, with a compiler of the computing device, functional codes for the first API based on the API coding template and the initial API parameters.

2. The method of claim 1, further comprising:
   dispatching one or more of the generated functional codes to a back-end of the software infrastructure.

3. The method of claim 1, further comprising:
   receiving a definition of two initial API parameters for use in generating the API coding table.

4. The method of claim 3, further comprising:
   receiving a unique ASCII string corresponding to the first API; and
   receiving a Type-Length-Value (TLV) corresponding to the first API.

5. The method of claim 1, wherein generating the API coding table comprises:
   generating the API coding table based on one or more user inputs identifying the one or more initial API parameters.

6. The method of claim 1, further comprising:
   batching multiple TLVs of a plurality of APIs into a single request payload for simultaneous transmission to a back-end of the software infrastructure.

7. The method of claim 1, wherein automatically generating the functional codes for the first API based on the API coding template and the initial API parameters comprises:
   defining an internal data structure useable to communicate between the first API and an API handler in a back-end of the software infrastructure;
   generating an enumeration definition for the TLV Type;
   receiving a front-end API handler definition;
   creating a back-end API handler definition;
   receiving a final API handler definition; and
   compiling the enumeration definition, the front-end API handler definition, the back-end API handler definition, and the final API handler definition with the compiler to generate functional codes for the first API.

8. One or more computer readable storage media encoded with software comprising computer executable instructions and when the software is executed operable to:
   receive a request for the addition of a first Application Programming Interface (API) to a software infrastructure of a computing device;
   generate an API coding table that includes one or more initial API parameters corresponding to the first API;
   obtain an API coding template stored in memory of the computing device; and
   automatically generate, with a compiler of the computing device, functional codes for the first API based on the API coding template and the initial API parameters.

9. The computer readable storage media of claim 8, further comprising instructions operable to:
   dispatch one or more of the generated functional codes to a back-end of the software infrastructure.

10. The computer readable storage media of claim 8, further comprising instructions operable to:
    receive a definition of two initial API parameters for use in generating the API coding table.

11. The computer readable storage media of claim 10, further comprising instructions operable to:
    receive a unique ASCII string corresponding to the first API; and receive a Type-Length-Value (TLV) corresponding to the first API.

12. The computer readable storage media of claim 8, wherein the instructions operable to generate the API coding table comprise instructions operable to:
   generate the API coding table based on one or more user inputs identifying the one or more initial API parameters.

13. The computer readable storage media of claim 8, further comprising instructions operable to:
   batch multiple TLVs of a plurality of APIs into a single request payload for simultaneous transmission to a back-end of the software infrastructure.

14. The computer readable storage media of claim 8, wherein the instructions operable to automatically generate the functional codes for the first API based on the API coding template and the initial API parameters comprise instructions operable to:
   define an internal data structure useable to communicate between the first API and an API handler in a back-end of the software infrastructure;
   generate an enumeration definition for the TLV Type;
   receive a front-end API handler definition;
   create a back-end API handler definition;
   receive a final API handler definition; and
   compile the enumeration definition, the front-end API handler definition, the back-end API handler definition, and the final API handler definition with the compiler to generate functional codes for the first API.

15. An apparatus comprising:
   a memory; and
   a processor configured to:
      receive a request for the addition of a first Application Programming Interface (API) to a software infrastructure of a computing device;
      generate an API coding table that includes one or more initial API parameters corresponding to the first API;
      obtain an API coding template stored in memory of the computing device; and
      automatically generate, with a compiler of the computing device, functional codes for the first API based on the API coding template and the initial API parameters.

16. The apparatus of claim 15, wherein the processor is further configured to:
   dispatch one or more of the generated functional codes to a back-end of the software infrastructure.

17. The apparatus of claim 15, wherein the processor is further configured to:
   receive a definition of two initial API parameters for use in generating the API coding table.

18. The apparatus of claim 17, wherein the processor is further configured to:
   receive a unique ASCII string corresponding to the first API; and
   receive a Type-Length-Value (TLV) corresponding to the first API.

19. The apparatus of claim 15, wherein the processor is further configured to:
   generate the API coding table based on one or more user inputs identifying the one or more initial API parameters.

20. The apparatus of claim 15, wherein the processor is further configured to:
   batch multiple TLVs of a plurality of APIs into a single request payload for simultaneous transmission to a back-end of the software infrastructure.

21. The apparatus of claim 15, wherein to automatically generate the functional codes for the first API based on the API coding template and the initial API parameters the processor is configured to:
   define an internal data structure useable to communicate between the first API and an API handler in a back-end of the software infrastructure;
   generate an enumeration definition for the TLV Type;
   receive a front-end API handler definition;
   create a back-end API handler definition;
   receive a final API handler definition; and
   compile the enumeration definition, the front-end API handler definition, the back-end API handler definition, and the final API handler definition with the compiler to generate functional codes for the first API.

* * * * *